United States Patent
Parida et al.

(10) Patent No.: US 12,380,915 B2
(45) Date of Patent: Aug. 5, 2025

(54) MACHINE LEARNING BASED EMOTION PREDICTION AND FORECASTING IN CONVERSATION

(71) Applicant: Accenture Global Solutions Limited, Dublin (IE)

(72) Inventors: Rosalin Parida, Soro (IN); Bhushan Gurmukhdas Jagyasi, Thane West (IN); Surajit Sen, Bangalore (IN); Aditi Debsharma, Thane (IN); Gopali Raval Contractor, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 406 days.

(21) Appl. No.: 18/071,884

(22) Filed: Nov. 30, 2022

(65) Prior Publication Data
US 2024/0177729 A1    May 30, 2024

(51) Int. Cl.
*G10L 25/63*    (2013.01)
*G10L 25/27*    (2013.01)

(52) U.S. Cl.
CPC ............ *G10L 25/63* (2013.01); *G10L 25/27* (2013.01)

(58) Field of Classification Search
CPC ......... G10L 25/63; G10L 25/27; G10L 17/02; G06F 40/35; G06F 40/30; G06N 5/01; G06N 20/20
See application file for complete search history.

(56) References Cited

U.S. PATENT DOCUMENTS

| | | | |
|---|---|---|---|
| 10,607,141 B2 * | 3/2020 | Jerram | G10L 15/08 |
| 2010/0205541 A1 * | 8/2010 | Rapaport | G06Q 30/02 |
| | | | 715/753 |
| 2015/0089399 A1 * | 3/2015 | Megill | H04L 12/1813 |
| | | | 715/753 |

(Continued)

OTHER PUBLICATIONS

Yuzhao Mao et al., "Dialogue TRM: Exploring the Intra- and Inter-Modal Emotional Behaviors in the Conversation", arXiv:2010.07637v1, [cs.CL], Oct. 15, 2020.

(Continued)

*Primary Examiner* — Michael N Opsasnick
(74) *Attorney, Agent, or Firm* — Polsinelli PC

(57) ABSTRACT

A method and system for emotion recognition and forecasting are disclosed. The method may include obtaining an audio data of a conversation involving a plurality of speakers and identifying a plurality of turns of the conversation from the plurality of utterances. The method may further include extracting audio embedding features from the plurality of turns, obtaining a plurality of text segments associated with the audio data, extracting text embedding features from the plurality of text segments, obtaining and concatenating speaker embedding features associated with the audio data, obtaining and concatenating a plurality of emotion features corresponding to the plurality of turns. The method further comprises executing a tree-based prediction model to predict emotion features of the plurality of speakers for a subsequent turn of the ongoing conversation based on the audio embedding features, text embedding features, the concatenated speaker embedding features, and the concatenated emotion features.

17 Claims, 13 Drawing Sheets

(56) References Cited

U.S. PATENT DOCUMENTS

| | | | | |
|---|---|---|---|---|
| 2016/0063998 | A1* | 3/2016 | Krishnamoorthy | G10L 15/22 |
| | | | | 704/254 |
| 2018/0307675 | A1* | 10/2018 | Akkiraju | G10L 15/22 |
| 2020/0143265 | A1* | 5/2020 | Jonnalagadda | G06N 3/045 |
| 2020/0286463 | A1* | 9/2020 | Galitsky | G06F 16/35 |
| 2022/0284194 | A1* | 9/2022 | Galitsky | G06F 40/35 |
| 2024/0177729 | A1* | 5/2024 | Parida | G10L 25/63 |

OTHER PUBLICATIONS

Chi-Chun Lee et al., "Modeling Mutual Influence of Interlocutor Emotion States in Dyadic Spoken Interactions", 10.21437/Interspeech-2009-480, Sep. 6-10, 2009.

Wei Li et al., "BiERU: Bidirectional Emotional Recurrent Unit for Conversational Sentiment Analysis", arXiv:2006.00492v3 [cs.CL] Jul. 4, 2021.

Navonil Majumder et al., "DialogueRNN: An Attentive RNN for Emotion Detection in Conversations", Association for the Advancement of Artificial Intelligence, arXiv:1811.00405v4 [cs.CL] May 25, 2019.

Sadat Shahriar et al., "Audio-Visual Emotion Forecasting: Characterizing and Predicting Future Emotion Using Deep Learning", May 2019.

Dong Zhang et al., "Modeling both Context- and Speaker-Sensitive Dependence for Emotion Detection in Multi-speaker Conversations", Proceedings of the Twenty-Eighth International Joint Conference on Artificial Intelligence (IJCAI-19), Aug. 2019.

Deepanway Ghosal et al., "DialogueGCN: A Graph Convolutional Neural Network for Emotion Recognition in Conversation", Proceedings of the 2019 Conference on Empirical Methods in Natural Language Processing and the 9th International Joint Conference on Natural Language Processing, pp. 154-164, Hong Kong, China, Nov. 3-7, 2019.

* cited by examiner

MACHINE LEARNING BASED EMOTION PREDICTION AND FORECASTING IN CONVERSATION

TECHNICAL FIELD

This disclosure relates to emotion recognition and forecasting, in particular, to machine learning based emotion prediction and forecasting in conversation.

BACKGROUND

Prediction or forecasting of future events from historical data has been studied in various technical fields, for example, equipment maintenance, network load balancing, human activity forecasting, financial event prediction, and facial action event prediction. However, it is less explored whether and how such prediction methods can be used in emotion forecasting from speech. The research of emotion forecasting holds promise for its potential applications in a variety of domains such as opinion mining, human-robot-interaction, and call center data analytics in various industries.

SUMMARY

This disclosure relates to systems and methods for emotion recognition and forecasting in conversations based on machine learning models.

In one embodiment, a method for emotion recognition and forecasting in conversations is disclosed. The method may be performed by a processor circuitry. The method may include obtaining an audio data of a conversation involving a plurality of speakers. The audio data may include a plurality of utterances of the speakers. The method may further include identifying a plurality of turns of the conversation from the plurality of utterances and extracting audio embedding features from the plurality of turns. A turn may represent a temporal speech window unit for analyzing emotion features of the speakers. The method may further include obtaining a plurality of text segments associated with the audio data and extracting text embedding features from the plurality of text segments. The method may further include obtaining speaker embedding features associated with the audio data and concatenating the speaker embedding features. The method may further include obtaining a plurality of emotion features corresponding to the plurality of turns and concatenating the plurality of emotion features. The plurality of emotion features may indicate temporal emotion dynamics of the speakers over the turns. The method may further include executing a tree-based prediction model to predict emotion features of the plurality of speakers for a subsequent turn of the ongoing conversation based on the audio embedding features, text embedding features, the concatenated speaker embedding features, and the concatenated emotion features.

In another embodiment, a system for emotion recognition and forecasting in conversations is disclosed. The system may include a memory having stored thereon executable instructions and a processor circuitry in communication with the memory. When executing the instructions, the processor circuitry may be configured to obtain an audio data of a conversation involving a plurality of speakers. The audio data may include a plurality of utterances of the speakers. The processor circuitry may be further configured to identify a plurality of turns of the conversation from the plurality of utterances and extract audio embedding features from the plurality of turns. A turn may represent a temporal speech window unit for analyzing emotion features of the speakers. The processor circuitry may be further configured to obtain a plurality of text segments associated with the audio data and extract text embedding features from the plurality of text segments. The processor circuitry may be further configured to obtain speaker embedding features associated with the audio data and concatenate the speaker embedding features. The processor circuitry may be further configured to obtain a plurality of emotion features corresponding to the plurality of turns and concatenate the plurality of emotion features. The plurality of emotion features may indicate temporal emotion dynamics of the speakers over the turns. The processor circuitry may be further configured to execute a tree-based prediction model to predict emotion features of the plurality of speakers for a subsequent turn of the ongoing conversation based on the audio embedding features, text embedding features, the concatenated speaker embedding features, and the concatenated emotion features.

In another embodiment, a product for emotion recognition and forecasting in conversations is disclosed. The product may include non-transitory machine-readable media and instructions stored on the machine-readable media. When being executed, the instructions may be configured to cause a processor to obtain an audio data of a conversation involving a plurality of speakers. The audio data may include a plurality of utterances of the speakers. The instructions may be further configured to cause the processor to identify a plurality of turns of the conversation from the plurality of utterances and extract audio embedding features from the plurality of turns. A turn may represent a temporal speech window unit for analyzing emotion features of the speakers. The instructions may be further configured to cause the processor to obtain a plurality of text segments associated with the audio data and extract text embedding features from the plurality of text segments. The instructions may be further configured to cause the processor to obtain speaker embedding features associated with the audio data and concatenate the speaker embedding features. The instructions may be further configured to cause the processor to obtain a plurality of emotion features corresponding to the plurality of turns and concatenate the plurality of emotion features. The plurality of emotion features may indicate temporal emotion dynamics of the speakers over the turns. The instructions may be further configured to cause the processor to execute a tree-based prediction model to predict emotion features of the plurality of speakers for a subsequent turn of the ongoing conversation based on the audio embedding features, text embedding features, the concatenated speaker embedding features, and the concatenated emotion features.

One interesting feature of the emotion recognition and forecasting systems and methods described below may be that the tree-based prediction model may predict emotions of all speakers in a conversation for a given turn based on the mutual influence of emotions of the speakers in the conversation. Additionally, due to its tree-based architecture, the emotion prediction model in the present disclosure is lightweight in comparison with the traditional emotion prediction models. The lightweight model normally consumes less memory storage and computing resources, which facilitates the deployment of the emotion recognition and forecasting systems and methods on various platforms including edged devices such as smartphones, tablets, and normal computers.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in an embodiment" or "in an implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

Emotion forecasting is the task of predicting the future emotion of a speaker, that is, predicting the emotion label of the future utterances based on the speaker's past and current audio cues. Capturing the dynamics of a conversation is a challenging task resulting in low accuracy emotion forecasting, which limits the development of practical applications. Moreover, complex architectures are proposed to deal with dynamics involved in emotion forecasting. However, these architectures have higher complexity which makes the development of real-time applications even more challenging.

To address the technical problems, the present disclosure describes emotion recognition and forecasting methods and systems, which make use of tree-based machine learning model to predict current and future emotions of speakers by taking into account the interdependency between speakers in a conversation. The interdependency between speakers may refer to the emotional influence that counterparts produce in a conversation, which is described later in the context of emotion features including emotion states and emotion attributes. As a result, the tree-based architecture described in the present disclosure enables the emotion recognition and forecasting methods and systems to be easily deployed in practical applications.

Figure 1:
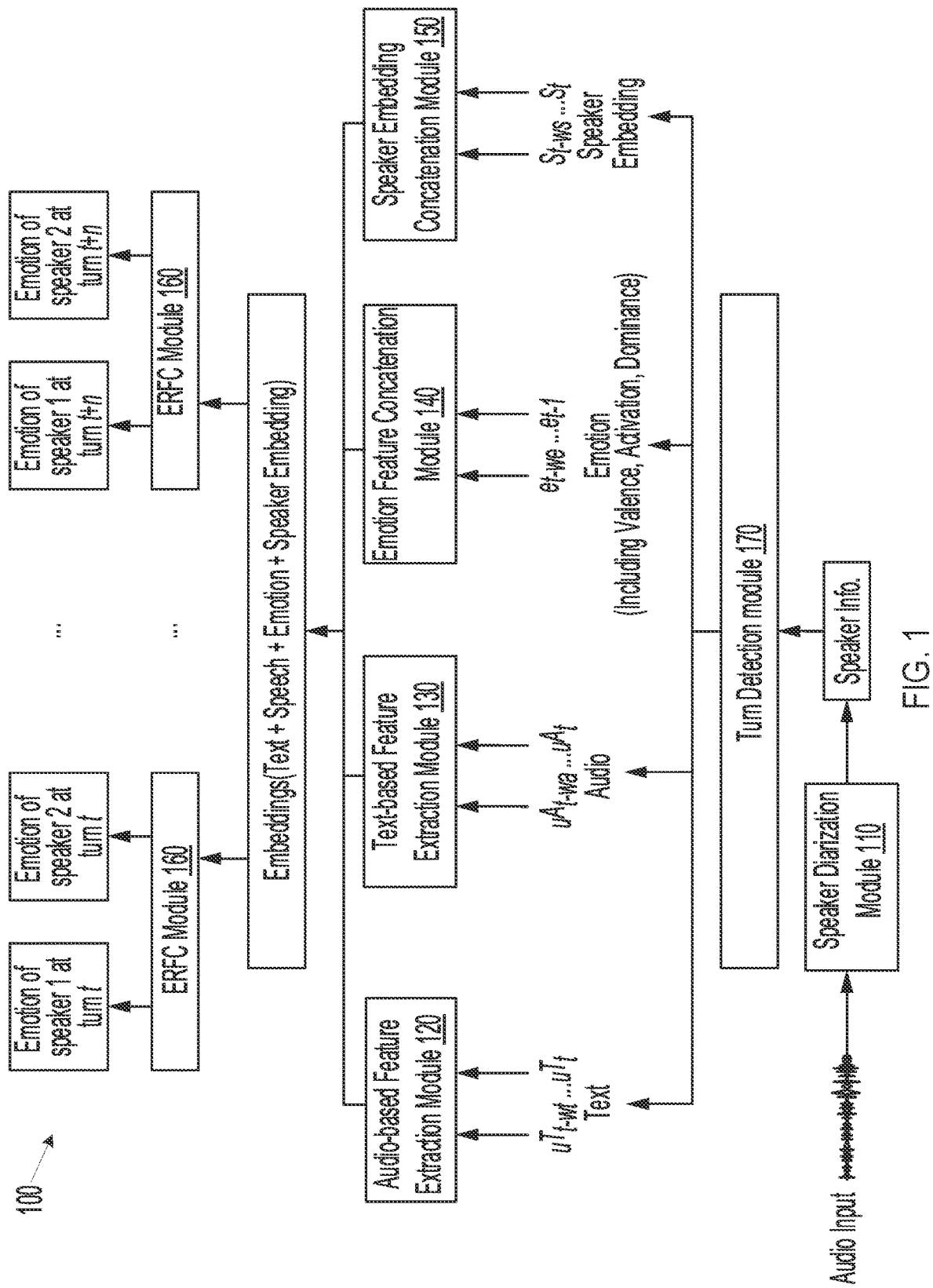
FIG. 1 shows an exemplary system for emotion recognition and forecasting of speakers in a conversation.

FIG. 1 shows exemplary architecture 100 for emotion recognition and forecasting of individual speakers in a conversation. In this example, the architecture 100 may include speaker diarization module 110, audio-based feature extraction module 120, text-based feature extraction module 130, emotion feature concatenation module 140, speaker embedding concatenation module 150, one or more emotion recognition and forecasting (ERFC) modules 160, and turn detection module 170. The modules may operate collaboratively to implement emotion recognition and forecasting as discussed in the present disclosure.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the unit. A module is configured to perform functions and achieve goals such as those described in this disclosure, and may work together with other related modules, programs, and components to achieve those functions and goals.

Figure 2:
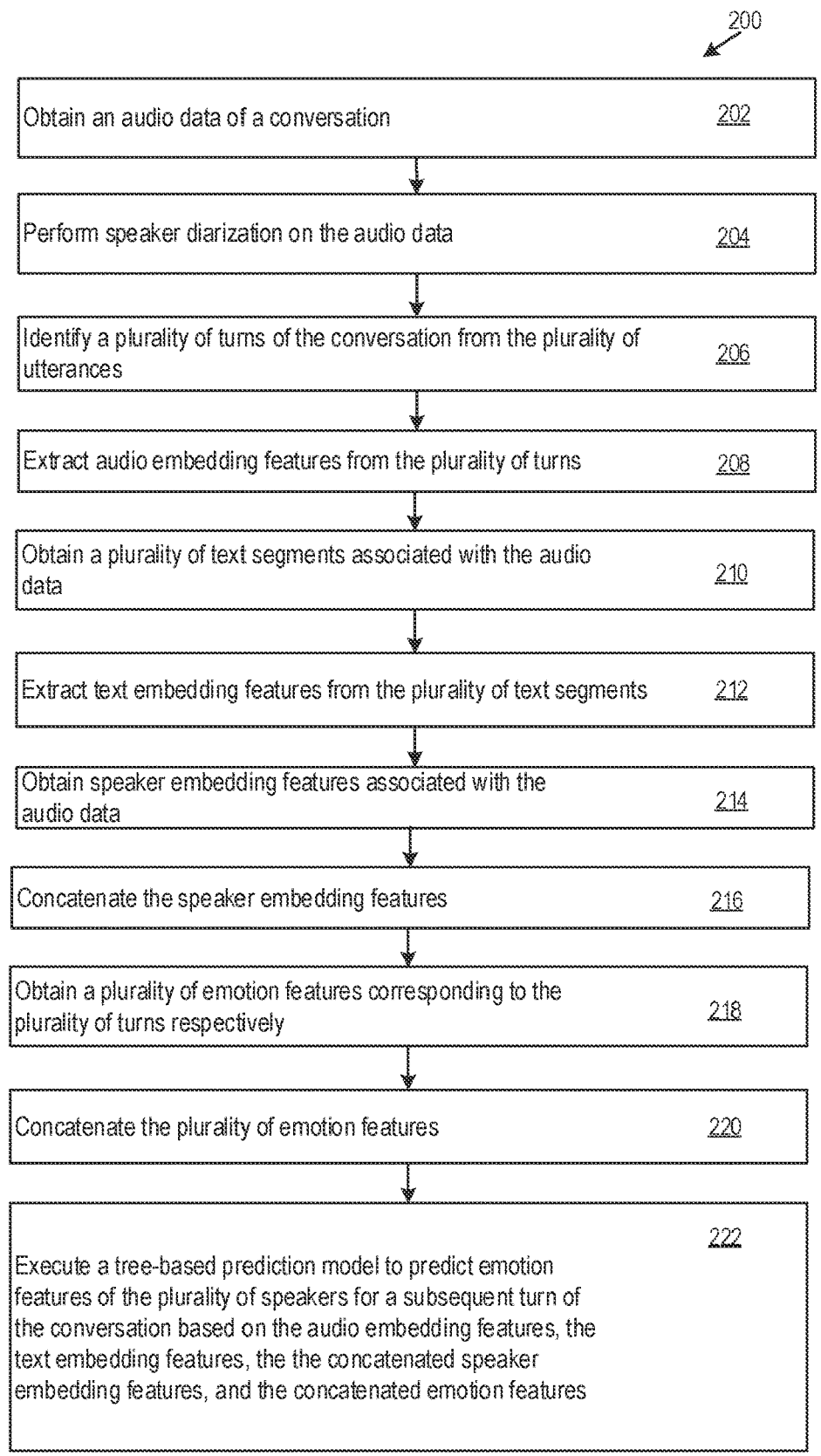
FIG. 2 shows an exemplary emotion recognition and forecasting logic.

FIG. 2 shows an exemplary emotion recognition and forecasting logic (ERFCL) 200. The logical features of the ERFCL 200 may be implemented in various orders and combinations. For example, in a first implementation, one or more features may be omitted or reordered with respect to a second implementation. The logical features will be discussed with reference to the modules in FIG. 1.

The ERFCL 200 may obtain an audio data of a conversation involving a plurality of speakers (202). The audio data may include a plurality of utterances of the speakers. In an example, the conversation may be an ongoing conversation between speakers. The ERFCL 200 may record the conversation as an audio stream in real time and capture a continuous audio recording from the audio stream as the audio data. In another example, the conversation has ended and is stored in a data storage such as a database. The ERFCL 200 may retrieve a continuous audio recording of a conversation from the database as the audio data.

After obtaining the audio data of the conversation, the ERFCL 200 may, at the speaker diarization module 110, perform speaker diarization on the audio data to generate a plurality of utterances of the speakers and label speaker information to the plurality of utterances (204). In an example, the speaker information may include speaker identity. The speaker diarization may annotate temporal regions of the audio data with speaker labels indicating the identity of the speakers. A common approach to this task is to perform two steps: segmentation of the input speech so that each speech segment belongs to one speaker, and segment clustering in order to regroup all segments of the same speaker. The speaker diarization tools may, for example, include pyAnnote.audio, COS+NME-SC, and PLDA+AHC. As a result, each of the plurality of generated utterances belongs to a single speaker and is labeled with identity of the speaker.

Figure 3:
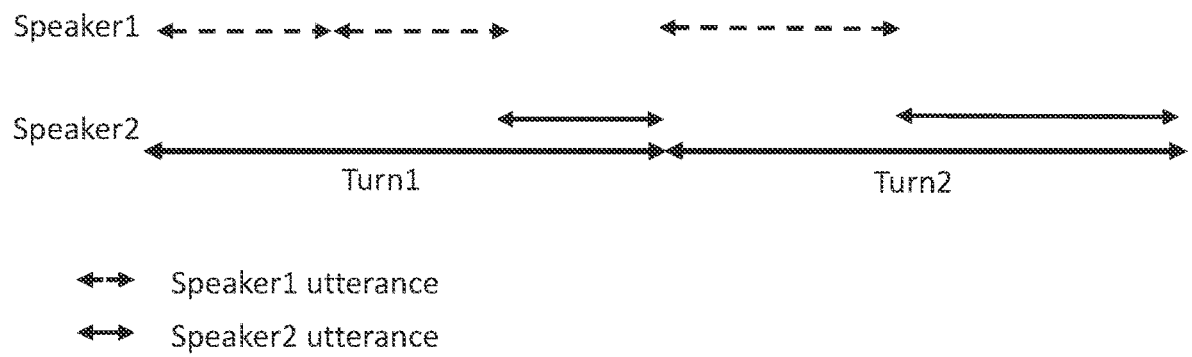
FIG. 3 exemplarily shows turns of utterance in a two-speaker conversation.

At the turn detection module 170, the ERFCL 200 may identify a plurality of turns of the conversation from the plurality of utterances (206). A turn may represent a temporal speech window unit for analyzing emotion features of the speakers. In an implementation, the ERFCL 200 may identify temporal consecutive utterances from the plurality of utterances as a turn such that the turn includes utterances from at least two consecutive speakers. For example, in a two-speaker conversation as shown in FIG. 3, a turn includes one or more utterances from each speaker. The example conversation includes two turns, Turn1 and Turn2. The Turn1 includes two utterances of the Speaker1 and one utterance of the Speaker2, while the Turn2 includes one utterance of the Speaker1 and one utterance of the Speaker2.

At the audio-based feature extraction module 120, the ERFCL 200 may extract audio embedding features from the plurality of turns (208). The audio embedding features may be low dimensional vector representations mapped from the signal of audio via techniques in machine learning. For example, the audio embeddings features may include melfrequency cepstral coefficients (MFCC), voice intensity, pitch and their statistics such as mean, root quadratic mean, and the like. In an implementation, the ERFCL 200 may execute an audio-based feature extraction model to extract the audio embedding features from the utterances in each of the plurality of turns. The audio-based feature extraction model may, for example, include Open-source Speech and Music Interpretation by Large-space Extraction (OpenSMILE), which is an open-source toolkit for audio feature extraction and classification of speech signals. It would be appreciated that other suitable audio feature extraction tools are applicable to the present disclosure. In an example, the current turn in the conversation is turn t and the ERFCL 200 may input turn utterances $u^A_{t-wa} \ldots u^A_t$ in the past wa turns and the current t turn into the audio-based feature extraction model to extract the audio embedding features for the turns, where wa is the audio context window size by turn. As a result, the ERFCL 200 may obtain the audio embedding features at turn level.

The ERFCL 200 may obtain a plurality of text segments associated with the audio data (210). In an implementation, the ERFCL 200 may utilize a speech-to-text tool to perform speech recognition to convert the audio data into text data. Then, the ERFCI 200 may identify the plurality of the text segments from the text data by turn of the conversation. The text segments in a turn may correspond to the utterances in the turn.

Subsequently, the ERFCL 200 may extract text embedding features from the plurality of text segments (212). The text embedding features may include, for example, word and sentence embedding vectors. Generally, words having the same meaning have a similar vector representation. In an implementation, the ERFCL 200 may execute a text-based feature extraction model to extract the text embedding features from the plurality of text segments. The text-based feature extraction model may, for example, include Bidirectional Encoder Representations from Transformers (BERT), 1D Convolutional Neural Network Models (1D-CNN), and Global Vectors for Word Representation (GloVe). It would be appreciated that other suitable text feature extraction tools are applicable to the present disclosure. In an example, the current turn in the conversation is turn t and the ERFCL 200 may input turn text segments $u^T_{t-wt} \ldots u^T_t$ in the past wt turns and the current turn t into the text-based feature extraction model to extract the text embedding features for the turns, where wt is the text context window size by turn. As a result, the ERFCL 200 may obtain the text embedding features at turn level.

The ERFCL 200 may obtain speaker embedding features associated with the audio data (214). The speaker embedding features may represent the speaker's characteristics of an utterance in a compact way, for example, as a vector of fixed size regardless of the length of the utterance. In an implementation, the ERFCL 200 may generate speaker embedding features for each of the speakers in the conversation based on the speaker information labelled to the plurality of utterances in the audio data.

At the speaker embedding concatenation module 150, the ERFCL 120 may concatenate the speaker embedding features (216). In an implementation, the speaker embedding features are in form of vectors. The ERFCL 120 may concatenate the speaker embedding features by combining the vectors to form a single vector as the concatenated speaker embedding features. For example, the current turn in the conversation is turn t and the ERFCL 200 may concatenate the speaker embedding features $s_{t-ws} \ldots s_t$ in the past "ws" turns and the current turn t, where "ws" is the speaker embedding context window size by turn.

Then, the ERFCL 200 may obtain a plurality of emotion features corresponding to the plurality of turns respectively (218). The plurality of emotion features indicating temporal emotion dynamics of the speakers over the turns. The emotion feature in a turn may include an emotion state and an emotion attribute for the turn. The emotion state may, for example, include Angry, Frustrated, Sad, Neutral, Happy, and Excited. The emotion state for a past turn may be labelled by a subject matter expert (SME). Alternatively, or additionally, the emotion state for the past turn may be recognized by an emotion recognition tool such as the emotion recognition and forecasting system discussed in the present disclosure. The emotion attribute may, for example, include three dimensions of attributes: Valence, Activation, and Dominance. The dimension of Valence may involve the intrinsic pleasantness or unpleasantness of an event or situation, which may distinguish between "positive" and "negative" semantic components. The dimension of Activation may concern whether a stimulus puts an organism into a state of increased or reduced activity, which may distinguish between "excited" and "calm" semantic components. The dimension of Dominance may involve whether or not individuals consider themselves able to deal with a particular situation or change and its cause, which may distinguish between "strong/dominant" and "weak/submissive" semantic components. In an implementation, the ERFCL 200 may perform acoustic analysis on the utterances in the audio data to obtain the emotion attributes for the plurality of turns.

After obtaining the plurality of emotion features, the ERFCL 200 may concatenate the plurality of emotion features (220). In an implementation, the emotion features are represented by vectors. The ERFCL 200 concatenate the vector representations into a single vector representation, which is the concatenated emotion features. For example, the current turn in the conversation is turn t and the ERFCL 200 may concatenate speaker embedding features $e_{t-we} \ldots$ $e_{t-1}$ of the past "we" turns, where "we" is the speaker embedding context window size by turn.

At the emotion recognition and forecasting (ERFC) module 160, the ERFCL 200 may execute a tree-based prediction model to predict emotion features of the plurality of speakers for one or more subsequent turns of the conversation based on the audio embedding features, the text embedding features, the concatenated speaker embedding features, and the concatenated emotion features (222). For example, the current turn is turn t, the ERFCL 200 may utilize the tree-based prediction model predict the emotion state of the speakers of the conversation in turn t+1, t+2, . . . , t+n. Alternatively, or additionally, the ERFCL 200 may utilize the tree-based prediction model to recognize the emotion state of the speakers in the current turn t. The tree-base prediction model may, for example, be a supervised learning models to address classification of speakers' utterances in conversation by constructing a tree-like structure to make prediction on the emotion states of the speakers.

In an implementation, the tree-based prediction model may include multiple layers of stacked ensemble models. Stacking is a way of aggregating base learners in ensemble learning. In stacking, a collection of base models in a lower layer are individually trained and subsequently, a stacker model in a higher layer is trained to use the aggregated predictions of the base models as its features. The stacker model performs better than base models by exploiting interactions between base models that offer enhanced predictive power. Stacking of base models can be implemented in multiple stages. In the multi-layer stacking, base learners are stacked in multiple levels. Prediction from the lower layer are fed to the higher layer stacker models.

Figure 4:
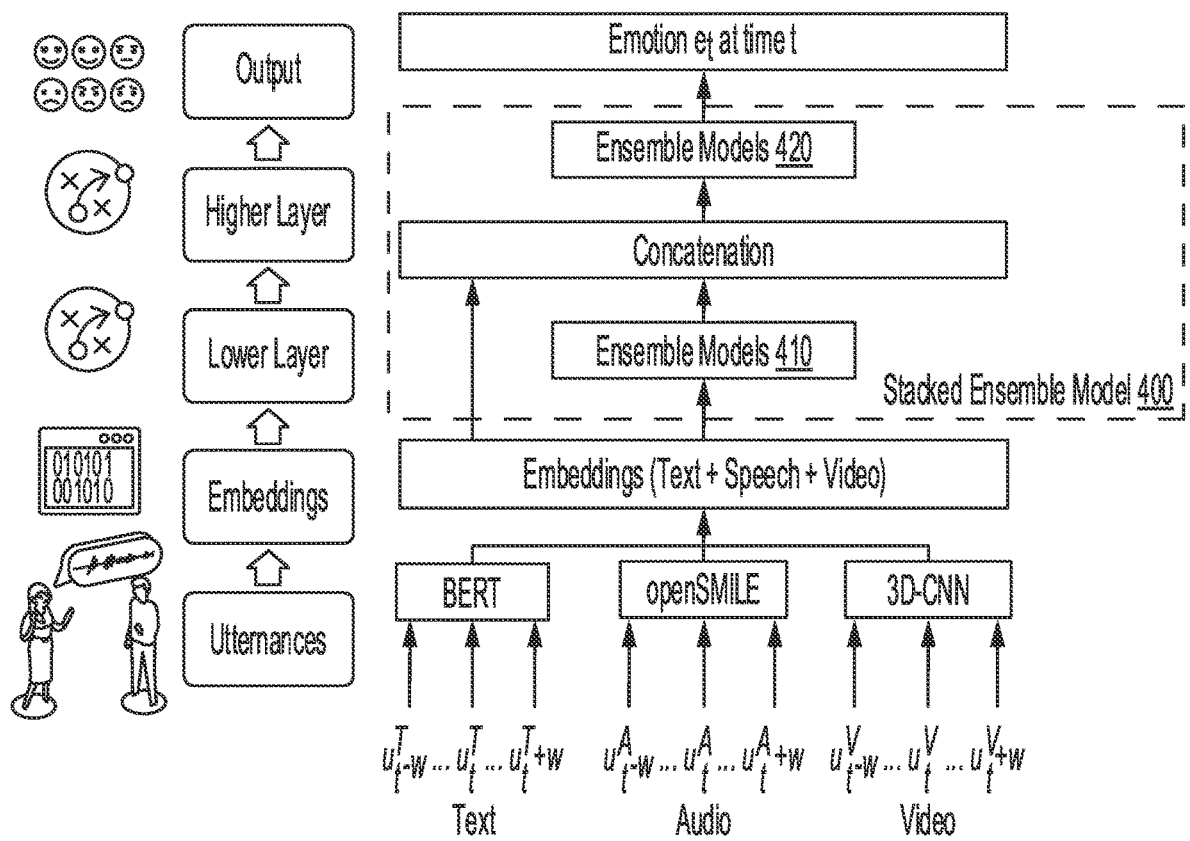
FIG. 4 shows an exemplary two-layer stacked ensemble model.

FIG. 4 shows an exemplary two-layer stacked ensemble model 400, each layer of which may include a plurality of ensemble models. The ensemble models 410 in the first layer (or lower layer) are the base models and each of the ensemble models 420 in the second layer (or higher layer) serve as the stacker model. The ensemble models may include a lightweight ensemble model such as Light Gradient Boosting Machine (LightGBM), and/or a deep learning ensemble model such as Recurrent Neural Network (RNN). The LightGBM is a gradient boosting framework that uses tree-based learning algorithms. The RNN a type of artificial neural network which uses sequential data or time series data to address ordinal or temporal problems.

In an implementation, the ERFCL 200 may input the audio embedding features, the text embedding features, the concatenated speaker embedding features, and the concatenated emotion features to the first layer of ensemble models for each of the first layer of ensemble model to predict intermediate emotion states of the plurality of speakers for the subsequent turn respectively, to obtain first layer emotion prediction results. Then, the ERFCL 200 may concatenate the first layer emotion prediction results with the audio embedding features, the text embedding features, the concatenated speaker embedding features, and the concatenated emotion features as intermediate concatenated embedding features and input the intermediated concatenated embedding features to the second layer of ensemble models for each of the second layer of ensemble models to predict intermediate emotion features of the plurality of speakers for the subsequent turn respectively, to obtain second layer emotion prediction results. The ERFCL 200 may determine the emotion features of the plurality of speakers for the subsequent turn based on the second layer prediction results. For example, the EFCL 200 may select one or more target ensemble models from the second layer of ensemble models based on a predetermined ensemble selection rule and determine the emotion prediction results by the target ensemble models as the final emotion features of the speakers for a subsequent turn.

Referring back to FIG. 2, the ERFCL 200 may identify a stage of the conversation based on the audio data. The stage may indicate progress of the conversation, for example, according to various conversational models appropriate to the conversational context or implementation domain. Taking a conversation between a customer and a customer care agent of a call center as an example, the stage may include Stage 1—Opening/Greeting, Stage 2—Establishing Expectations, Stage 3—Business conversation, Stage 4—Wrap-up & Feedback, and Stage 5—Closing.

Figure 5:
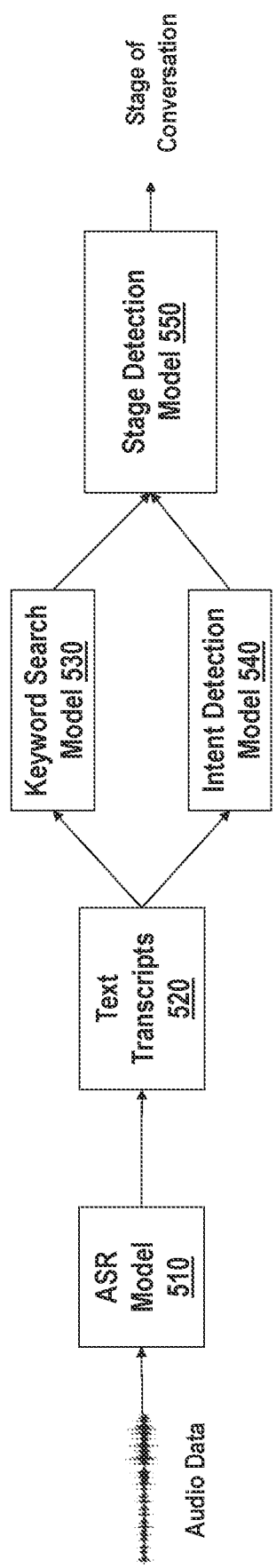
FIG. 5 shows an exemplary logic for determining a stage of conversation.

In an implementation, the ERFCL 200 may identify an intent of the conversation based on the audio data, and determine the stage of the conversation based on the intent of the conversation. As shown in FIG. 5, the ERFCL 200 may utilize an automatic speech recognition (ASR) model 510 to convert the audio data into text transcripts 520. Then, the ERFCL 200 may input the text transcripts 520 to an intent detection model 540 to identify the intent from the transcripts and input the text transcripts 520 to the keyword search model 530 to identify keywords for each stage. The ERFCL 200 may utilize a stage detection model 550 to determine the stage of the conversation based on the keywords in the text transcripts and the identified intent. The stage detection model 550 may be a rule-based model or a deep-learning-based model. For example, the ERFCL 200 may determine Stage 1 by the keywords such as "Hi" or "Hello" and Stage 5 by the key words "Thank you" or "Goodbye." The ERFCL 200 may determine Stage 2 by the identified intent, topic, or purpose and by the active listening from the customer care agent. The ERFCL 200 may determine Stage 3 by the identified intent of matching expectation between the customer and the customer care agent and the issue and solutioning keywords pairs identified from Stage 2. The ERFCL 200 may determine Stage 4 by the identified intent of repeating the offered solution and offering further support.

Figure 6:
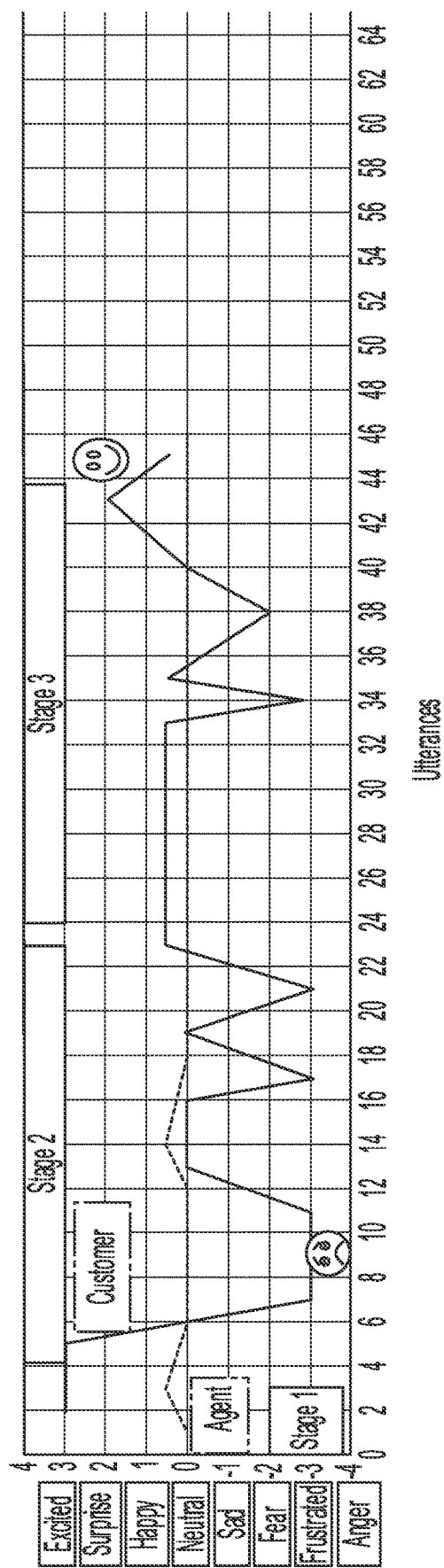
FIG. 6 shows exemplary emotion state dynamics of the speakers in a conversation.

Then, the ERFCL 200 may generate and output a conversation recommendation to a user device of one of the speakers to facilitate the conversation based on the predicted emotion features of the plurality of speakers and the stage of the conversation. In an exemplary context of a conversation between a customer and a customer care agent of a call center as shown in FIG. 6, the ERFCL 200 may generate the conversation recommendation using rule-based or deep-learning-based recommendation engine with the predicted emotion states of the customer and the customer care agent and the current stage of the conversation as input. The recommendation engine would be trained with the objective of making the customer's emotion to go towards a positive direction. The conversation recommendation may include, for example, alerting the customer care agent when the predicted emotion features of the customer is heading towards a negative direction, changing the tone of the customer care agent, adjusting valence of the customer care agent, and recommended response to the customer.

For example, the customer is predicted to be Frustrated and the current stage is Stage 2—Establishing Expectation. The ERFCL 200 may generate the conversation recommendation based on the stage-wise emotion of the customer. The ERFCL 200 may determine the stage-wise emotion of the customer by taking a majority of the turn-wise emotions of the customer for all the turns in the stage. As the customer is talking about some additional charges on her, the ERFCL

200 may generate and output a recommendation action to the agent's work station device to remind the customer care agent to help the customer understand what went wrong in the transaction. For another example, the current stage is Stage 3—Business conversation and the predicted emotion state of the customer is frustrated because the customer is worried that this additional charge will happen again. With the recommendation engine, the ERFCL 200 may generate and output to the agent's work station device a recommendation action to ask the customer care agent to give the customer the fastest grievance procedure, for example, offering the customer a new card to avoid the additional charge.

With the features of emotion recognition and forecasting discussed in the present disclosure, the customer care agent would be able to better understand the emotion states of both the customers and the customer care agent in the present and upcoming utterances, thereby timely taking corrective measures in the current conversation if the forecast of the conversation is heading towards a negative direction. In addition, the customer care agent may leverage the recommendation actions generated in real time to improve the quality of conversation on the agent's side, which may lead to improvement in the forecast result of the overall conversation due to the interdependency of speakers.

In another exemplary implementation, when the conversation comes to an end, the ERFCL 200 may generate a conversation analysis summary for the conversation based on the dynamics of the speakers' emotion statements in the conversation. The ERFCL 200 may obtain stage-wise emotions of the speakers for all stages throughout the conversation and input the stage-wise emotions to a knowledge model to detect the emotion transitions of the speakers and analyze the reasons for improving/deteriorating conversation quality based on the emotion transitions. Then, the ERFCL 200 may convert the analysis result to structured data and input the structured data to a natural language generation (NLG) model to generate the conversation analysis summary for the conversation. For example, based on the speakers' emotion state chart over the conversation as shown in FIG. 6, the ERFCL 200 may generate the conversation analysis summary: such as the following: "The customer was frustrated in the initial phase. However, the customer care agent did a great job in convincing the customer and made her happy in the third stage."

Figure 7A:
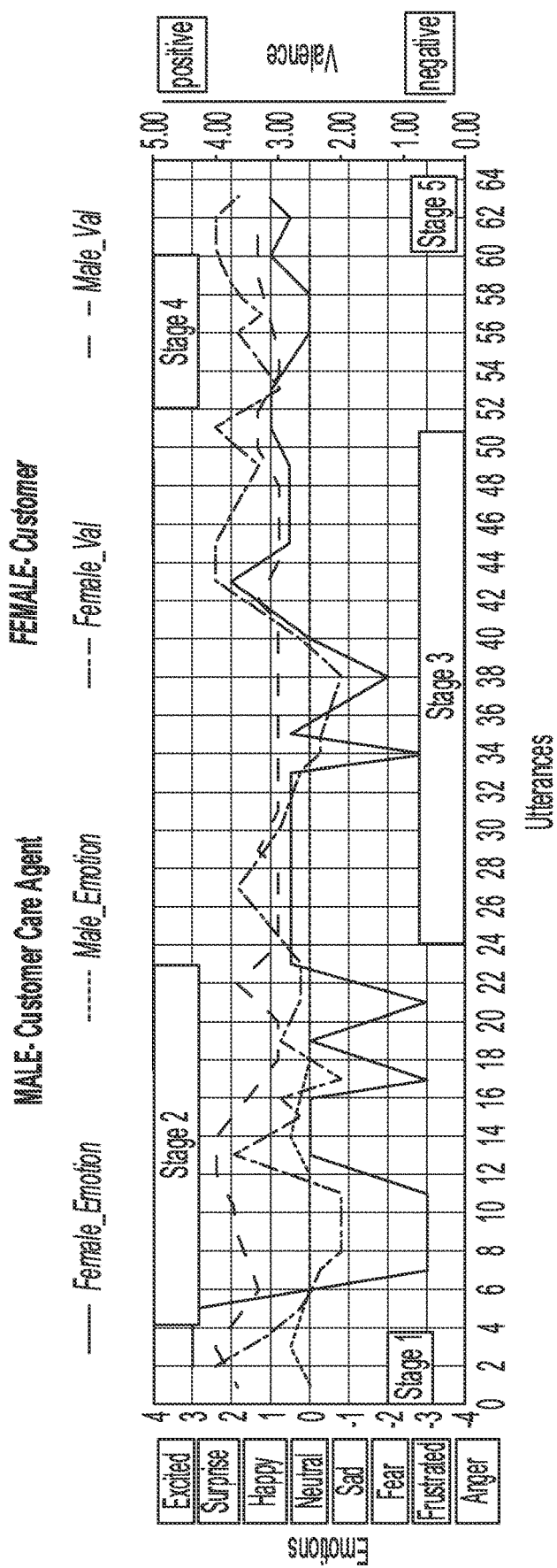
FIGS. 7A and 7B exemplarily shows the inter-speaker dependency in the context of the emotion attribute Valence.
Figure 7B:
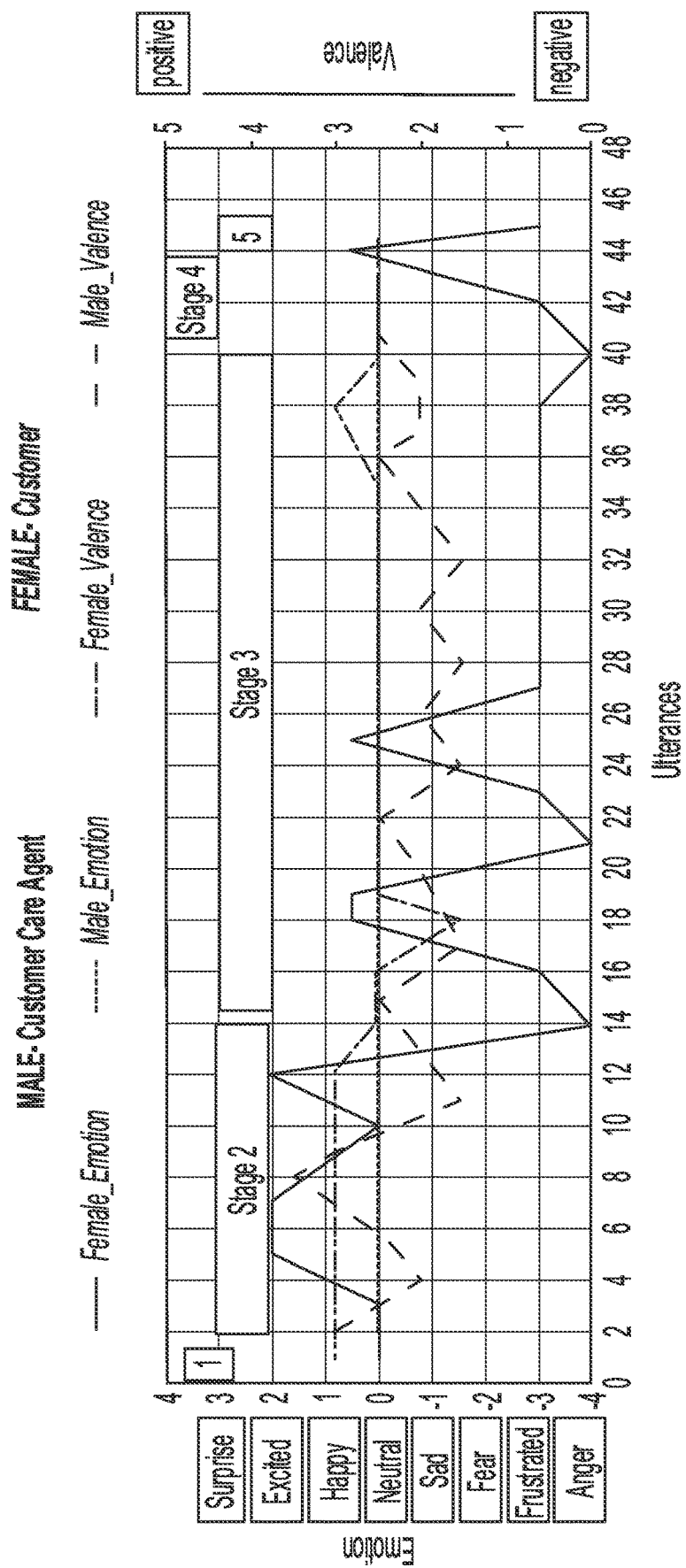

FIGS. 7A and 7B exemplarily show the inter-speaker dependency in the context of the emotion attribute Valence. In FIG. 7A, the customer care agent has constantly maintained neutral emotion with positivity in his tone which has helped him in convincing the customer who was frustrated after her couple of utterances, but her emotion changed to the positive side along with the Valence in the later stage. In contrast, in FIG. 7B, although the customer care agent has a neutral emotion, he has negativity in his tone which is not helping the customer care agent to develop a positive feeling and ultimately the conversation ends with a negative emotion from the customer's end.

Figure 8A:
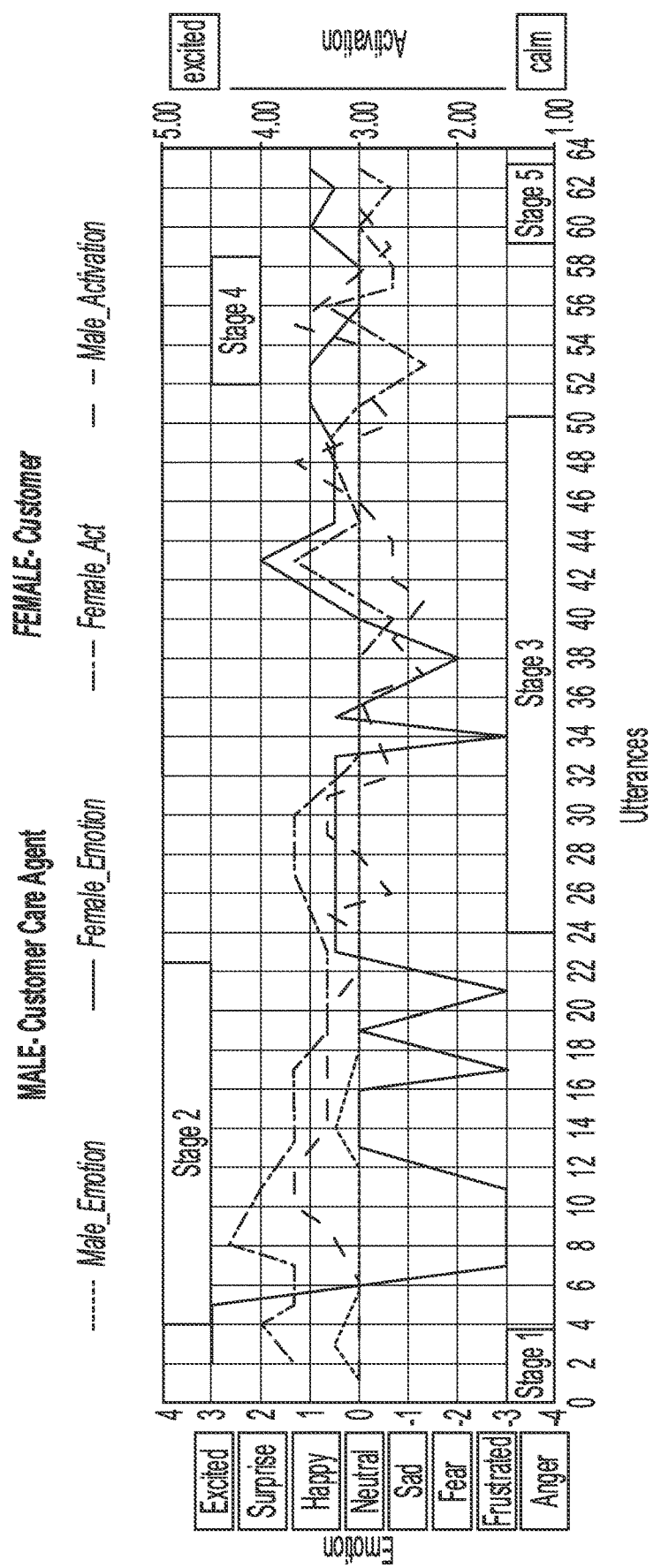
FIGS. 8A and 8B exemplarily shows the inter-speaker dependency in the context of the emotion attribute Activation.
Figure 8B:
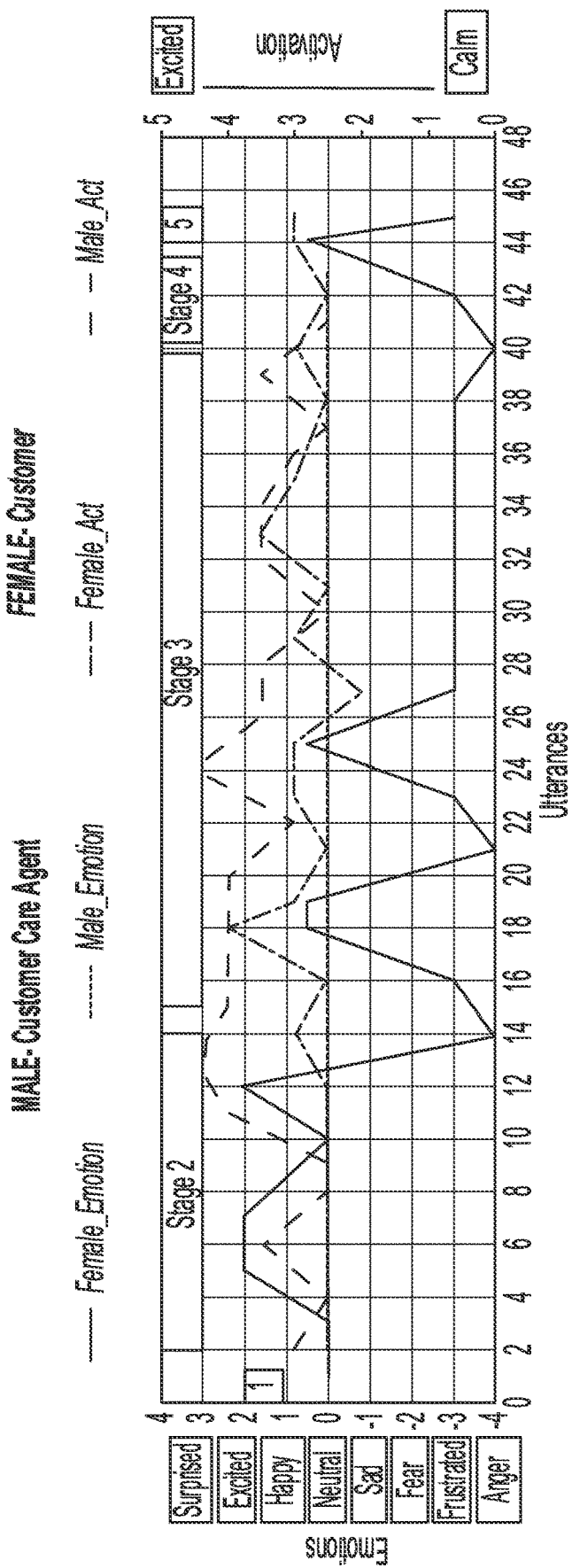

FIGS. 8A and 8B exemplarily show the inter-speaker dependency in the context of the emotion attribute Activation. In FIG. 8A, the customer care agent has managed to balance well with the Activation level of the customer and helped in bringing the emotion of the customer to the positive side. In contrast, in FIG. 8B, although the customer care agent has neutral emotion state, his level of Activation is on the higher side throughout the conversation. This negativity in the Activation level fails to pacify the customer's Activation level.

Figure 9A:
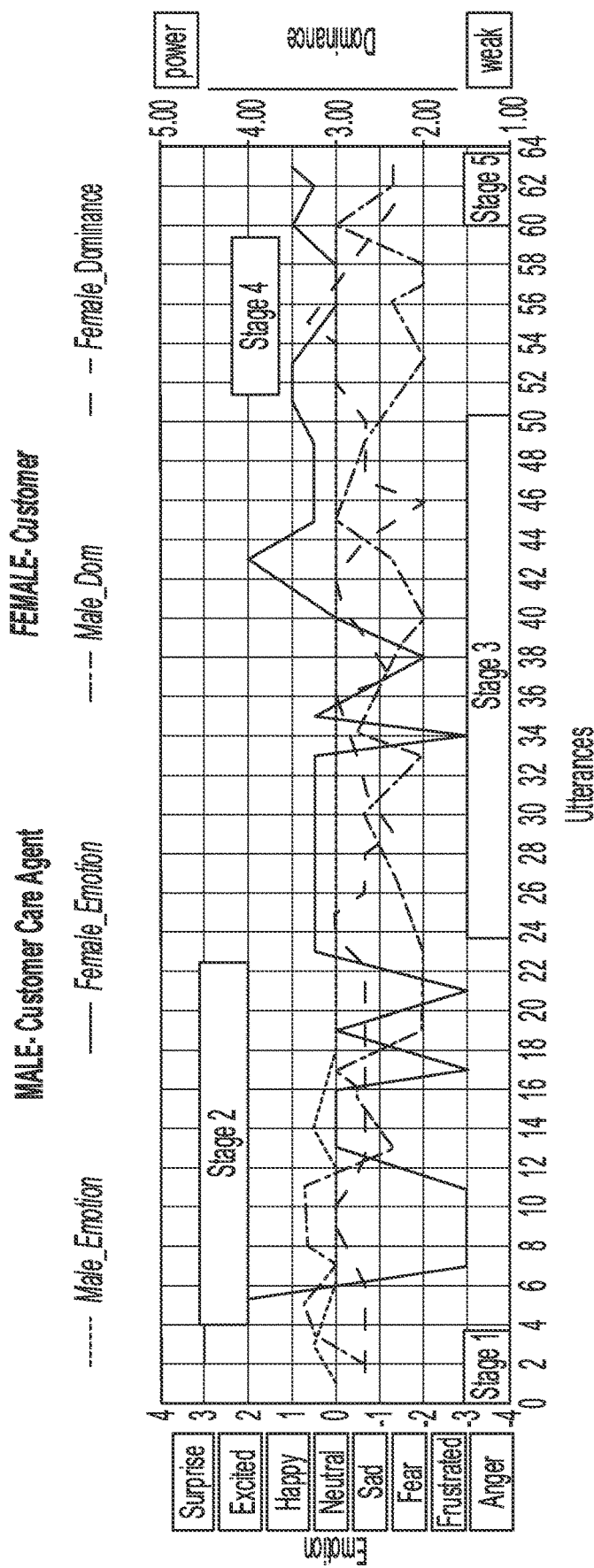
FIGS. 9A and 9B exemplarily shows the inter-speaker dependency in the context of the emotion attribute Dominance.
Figure 9B:
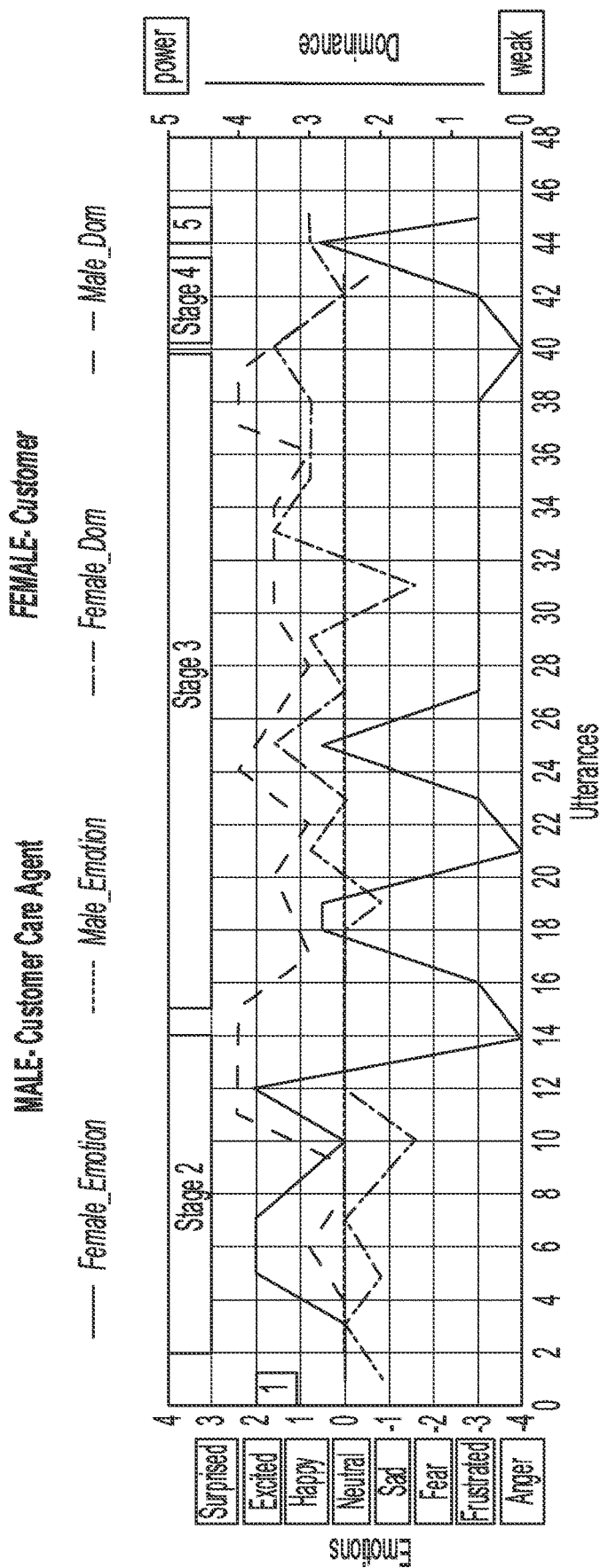

FIGS. 9A and 9B exemplarily shows the inter-speaker dependency in the context of the emotion attribute Dominance. In FIG. 9A, the emotion of the customer drops to the negative side after couple of utterances. However neutral emotion and minimal dominance in the tone of the customer care agent help in assuring the customer and bring her emotion on the positive side. In contrast, in FIG. 9B, the Dominance level in the customer care agent voice is consistently high which reveals the dominating characteristics in his tone. This further negatively influenced both Dominance and the emotion of the customer.

Figure 10:
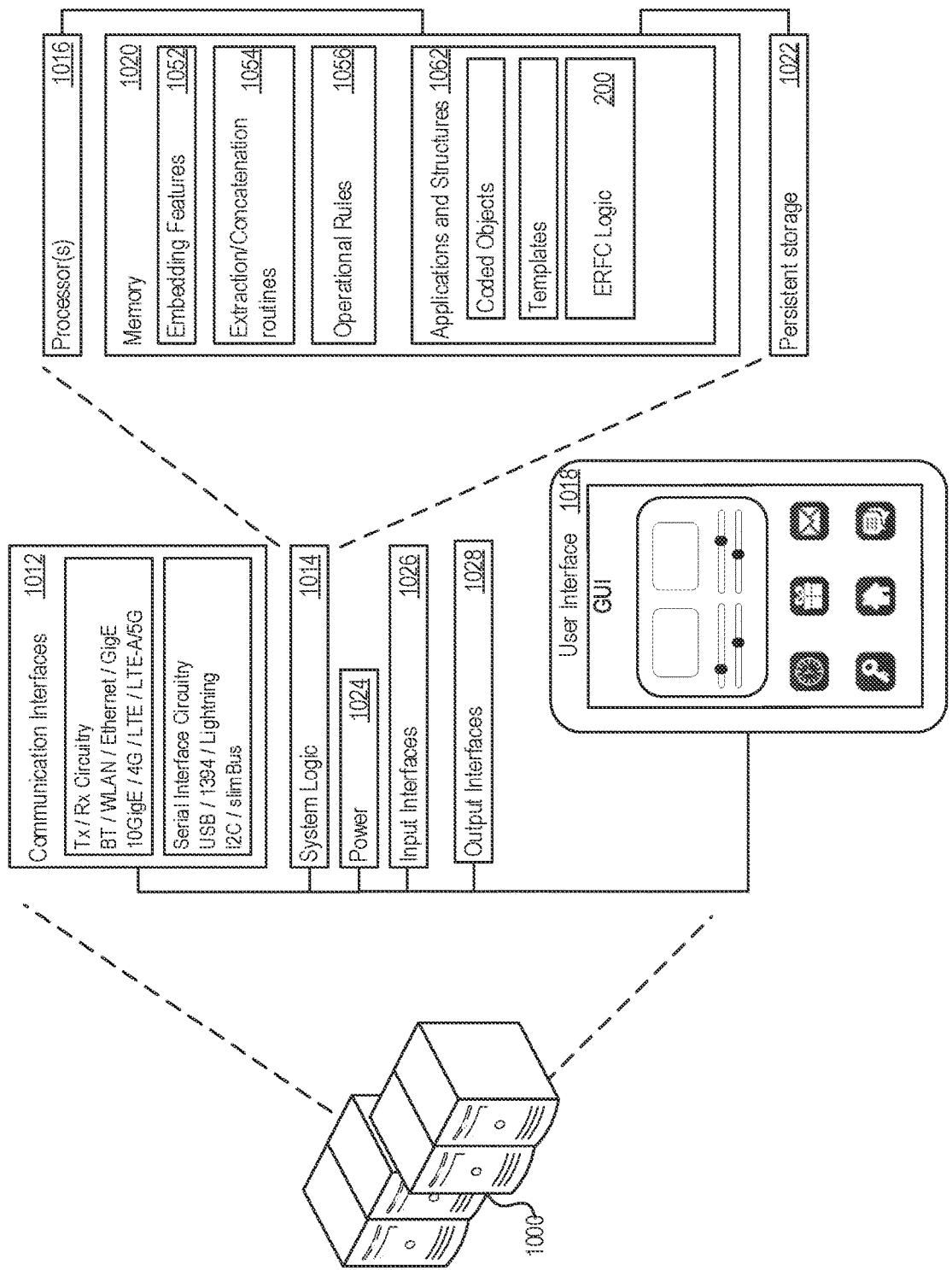
FIG. 10 shows an exemplary specific execution environment for executing the emotion recognition and forecasting logic.

FIG. 10 shows an exemplary specific execution environment for executing the ERFC logic 200 as described above. The execution environment 1000 may include system logic 1014 to support execution of the ERFC logic 200 described above. The system logic 1012 may include processors 1016, memory 1020, and/or other circuitry. The memory 1020 may include embedding features 1052, extraction and concatenation routines 1054, and operational rules 1056. The memory 520 may further include applications and structures 1062, for example, coded objects, machine instructions, templates, or other structures to support extracting audio/text embedding features, obtaining speaker embedding features and emotion features, predicting emotion features, or other tasks described above. The applications and structures may implement the ERFC logic 200.

The execution environment 1000 may also include communication interfaces 1012, which may support wireless, e.g. Bluetooth, Wi-Fi, WLAN, cellular (4G, LTE/A, 5G), and/or wired, Ethernet, Gigabit Ethernet, optical networking protocols. The communication interfaces 1012 may also include serial interfaces, such as universal serial bus (USB), serial ATA, IEEE 1394, lighting port, I²C, slimBus, or other serial interfaces. The execution environment 1000 may include power functions 1024 and various input interfaces 1026. The execution environment may also include a user interface 1018 that may include human-to-machine interface devices and/or graphical user interfaces (GUI). In some implementations, the system logic 1014 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk;

or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

What is claimed is:

1. A method for emotion recognition and forecasting in conversations comprising:
    obtaining, with a processor circuitry, an audio data of a conversation involving a plurality of speakers, the audio data comprising a plurality of utterances of the speakers;
    identifying a plurality of turns of the conversation from the plurality of utterances, a turn representing a temporal speech window unit for analyzing emotion features of the speakers;
    extracting, with the processor circuitry, audio embedding features from the plurality of turns;
    obtaining, with the processor circuitry, a plurality of text segments associated with the audio data;
    extracting, with the processor circuitry, text embedding features from the plurality of text segments;
    obtaining, with the processor circuitry, speaker embedding features associated with the audio data;
    concatenating, with the processor circuitry, the speaker embedding features;
    obtaining, with the processor circuitry, a plurality of emotion features corresponding to the plurality of turns, the plurality of emotion features indicating temporal emotion dynamics of the speakers over the turns;
    concatenating, with the processor circuitry, the plurality of emotion features; and
    executing, with the processor circuitry, a tree-based prediction model to predict emotion features of the plurality of speakers for a subsequent turn of the conversation based on the audio embedding features, text embedding features, the concatenated speaker embedding features, and the concatenated emotion features,
    wherein the tree-based prediction model comprises multiple layers of stacked ensemble models, and
    wherein the multiple layers of stacked ensemble models comprise a first layer of ensemble models and a second layer of ensemble models, the executing the tree-based prediction model to predict the emotion features of the plurality of speakers for a subsequent turn of the conversation comprises:
        inputting the audio embedding features, the text embedding features, the concatenated speaker embedding features, and the concatenated emotion features to the first layer of ensemble models for each of the first layer of ensemble model to predict intermediate emotion features of the plurality of speakers for the subsequent turn respectively, to obtain first layer emotion prediction results;
        concatenating the first layer emotion prediction results with the audio embedding features, the text embedding features, the concatenated speaker embedding features, and the concatenated emotion features as intermediate concatenated embedding features;
        inputting the intermediated concatenated embedding features to the second layer of ensemble models for each of the second layer of ensemble models to predict intermediate emotion features of the plurality of speakers for the subsequent turn respectively, to obtain second layer emotion prediction results; and
        determining the emotion features of the plurality of speakers for the subsequent turn based on the second layer prediction results.

2. The method of claim 1, where the identifying the plurality of turns from the plurality of utterances comprises:
    identifying temporal consecutive utterances from the plurality of utterances as a turn such that the turn comprises utterances from at least two consecutive speakers.

3. The method of claim 1, where the extracting the audio embedding features from the plurality of turns comprises:
    executing an audio-based feature extraction model to extract the audio embedding features from the plurality of turns.

4. The method of claim 1, where the extracting the text embedding features from the plurality of text segments comprises:
    executing a text-based feature extraction model to extract the text embedding features from the plurality of text segments.

5. The method of claim 1, where the method further comprises:

performing speaker diarization on the audio data to generate the plurality of utterances of the speakers and label speaker information to the plurality of utterances;
the obtaining the speaker embedding features associated with the audio data comprises:
generating speaker embedding features for each of the speakers based on the speaker information labelled to the plurality of utterances.

6. The method of claim 1, where the obtaining the plurality of text segments associated with the audio data comprises:
performing speech recognition to convert the audio data into text data; and
identifying the plurality of text segments from the text data by turn of the conversation.

7. The method of claim 1, where a layer of the stacked ensemble models comprises a lightweight ensemble model or a deep learning ensemble model.

8. The method of claim 1, the method further comprises:
in response to an end of the conversation, generating a conversation analysis summary for the conversation based on the plurality of emotion features.

9. The method of claim 1, where the method further comprises:
identifying a stage of the conversation based on the audio data, the stage indicating progress of the conversation; and
generating and outputting a conversation recommendation to facilitate the conversation based on the predicted emotion features of the plurality of speakers and the stage of the conversation.

10. The method of claim 9, where the identifying the stage of the conversation based on the audio data comprises:
identifying an intent of the conversation based on the audio data; and
determine the stage of the conversation based on the intent of the conversation.

11. The method of claim 1, where an emotion feature comprises an emotion state and an emotion attribute, the emotion state comprises angry, frustrated, sad, neutral, happy, or excited, and the emotion attribute comprises valence, activation, or dominance.

12. The method of claim 11, where the method further comprises:
performing acoustic analysis on the audio data to obtain emotion attributes for the plurality of turns.

13. A system for emotion recognition and forecasting in conversations, comprising:
a memory having stored thereon executable instructions;
a processor circuitry in communication with the memory, the processor circuitry when executing the instructions configured to:
obtain an audio data of a conversation involving a plurality of speakers, the audio data comprises a plurality of utterances of the speakers;
identify a plurality of turns of the conversation from the plurality of utterances, a turn representing a temporal speech window unit for analyzing emotion features of the speakers;
extract audio embedding features from the plurality of turns;
obtain a plurality of text segments associated with the audio data;
extract text embedding features from the plurality of text segments;
obtain speaker embedding features associated with the audio data;
concatenating the speaker embedding features;
obtain a plurality of emotion features corresponding to the plurality of turns, the plurality of emotion features indicating temporal emotion dynamics of the speakers over the turns;
concatenate the plurality of emotion features; and
execute a tree-based prediction model to predict emotion features of the plurality of speakers for a subsequent turn of the conversation based on the audio embedding features, text embedding features, the concatenated speaker embedding features, and the concatenated emotion features,
wherein the tree-based prediction model comprises multiple layers of stacked ensemble models, and
wherein the multiple layers of stacked ensemble models comprise a first layer of ensemble models and a second layer of ensemble models, the executing the tree-based prediction model to predict the emotion features of the plurality of speakers for a subsequent turn of the conversation comprises:
inputting the audio embedding features, the text embedding features, the concatenated speaker embedding features, and the concatenated emotion features to the first layer of ensemble models for each of the first layer of ensemble model to predict intermediate emotion features of the plurality of speakers for the subsequent turn respectively, to obtain first layer emotion prediction results;
concatenating the first layer emotion prediction results with the audio embedding features, the text embedding features, the concatenated speaker embedding features, and the concatenated emotion features as intermediate concatenated embedding features;
inputting the intermediated concatenated embedding features to the second layer of ensemble models for each of the second layer of ensemble models to predict intermediate emotion features of the plurality of speakers for the subsequent turn respectively, to obtain second layer emotion prediction results; and
determining the emotion features of the plurality of speakers for the subsequent turn based on the second layer prediction results.

14. The system of claim 13, where the processor circuitry is further configured to:
identify a stage of the conversation based on the audio data, the stage indicating progress of the conversation; and
generate and output a conversation recommendation to facilitate the conversation based on the predicted emotion features of the plurality of speakers and the stage of the conversation.

15. The system of claim 13, where the processor circuitry is configured to:
execute an audio-based feature extraction model to extract the audio embedding features from the plurality of turns.

16. The system of claim 13, where the processor circuitry is configured to:
execute a text-based feature extraction model to extract the text embedding features from the plurality of text segments.

17. A product for emotion recognition and forecasting, comprising:
non-transitory machine-readable media; and instructions stored on the machine-readable media, the instructions configured to, when executed, cause a processor circuitry to:
 obtain an audio data of a conversation involving a plurality of speakers, the audio data comprises a plurality of utterances of the speakers;
 identify a plurality of turns of the conversation from the plurality of utterances, a turn representing a temporal speech window unit for analyzing emotion features of the speakers;
 extract audio embedding features from the plurality of turns;
 obtain a plurality of text segments associated with the audio data;
 extract text embedding features from the plurality of text segments;
 obtain speaker embedding features associated with the audio data;
 concatenating the speaker embedding features;
 obtain a plurality of emotion features corresponding to the plurality of turns, the plurality of emotion features indicating temporal emotion dynamics of the speakers over the turns;
 concatenate the plurality of emotion features; and
 execute a tree-based prediction model to predict emotion features of the plurality of speakers for a subsequent turn of the conversation based on the audio embedding features, text embedding features, the concatenated speaker embedding features, and the concatenated emotion features,
 wherein the tree-based prediction model comprises multiple layers of stacked ensemble models, and wherein the multiple layers of stacked ensemble models comprise a first layer of ensemble models and a second layer of ensemble models, the executing the tree-based prediction model to predict the emotion features of the plurality of speakers for a subsequent turn of the conversation comprises:
 inputting the audio embedding features, the text embedding features, the concatenated speaker embedding features, and the concatenated emotion features to the first layer of ensemble models for each of the first layer of ensemble model to predict intermediate emotion features of the plurality of speakers for the subsequent turn respectively, to obtain first layer emotion prediction results;
 concatenating the first layer emotion prediction results with the audio embedding features, the text embedding features, the concatenated speaker embedding features, and the concatenated emotion features as intermediate concatenated embedding features;
 inputting the intermediated concatenated embedding features to the second layer of ensemble models for each of the second layer of ensemble models to predict intermediate emotion features of the plurality of speakers for the subsequent turn respectively, to obtain second layer emotion prediction results; and
 determining the emotion features of the plurality of speakers for the subsequent turn based on the second layer prediction results.

* * * * *